United States Patent
Salpekar et al.

(10) Patent No.: US 7,418,633 B1
(45) Date of Patent: Aug. 26, 2008

(54) METHOD AND APPARATUS FOR IMMUNIZING APPLICATIONS ON A HOST SERVER FROM FAILOVER PROCESSING WITHIN A SWITCH

(75) Inventors: Ajay P. Salpekar, Fremont, CA (US);
Shiv Rajpal, Fremont, CA (US);
Ravindra B. Venkataramaiah, San Jose, CA (US)

(73) Assignee: Symantec Operating Corporation, Cupertino, CA (US)

(*) Notice: Subject to any disclaimer, the term of this patent is extended or adjusted under 35 U.S.C. 154(b) by 439 days.

(21) Appl. No.: 10/844,732

(22) Filed: May 13, 2004

(51) Int. Cl.
*G06F 11/00* (2006.01)
(52) U.S. Cl. .............. 714/43; 714/4; 714/48; 709/223; 709/224
(58) Field of Classification Search .......... 714/43, 714/48
See application file for complete search history.

(56) References Cited

U.S. PATENT DOCUMENTS

| | | | |
|---|---|---|---|
| 6,502,162 B2* | 12/2002 | Blumenau et al. | 711/5 |
| 6,996,672 B2* | 2/2006 | Lubbers et al. | 711/114 |
| 2002/0129146 A1* | 9/2002 | Aronoff et al. | 709/225 |
| 2003/0236930 A1* | 12/2003 | Paul | 710/33 |
| 2004/0148397 A1* | 7/2004 | Aronoff et al. | 709/227 |

OTHER PUBLICATIONS

Microsoft Computer Dictionary, 2002, Microsoft Press, 5th Ed., pp. 81.*

* cited by examiner

*Primary Examiner*—Emerson C Puente
(74) *Attorney, Agent, or Firm*—Moser IP Law Group

(57) ABSTRACT

A method and apparatus for providing host server immunization from a failover process that may occur within a data switch that couples the host server to a storage volume. To facilitate such immunization, the method and apparatus caches non-read/write information that is generated by the switch during initialization of the storage volume to host server communication. Upon failover of a switch component within a failover pair of switch components in the switch, the read/write requests issued by the server are ignored and any non-read/write information commands are responded to using the cached information.

14 Claims, 4 Drawing Sheets

METHOD AND APPARATUS FOR IMMUNIZING APPLICATIONS ON A HOST SERVER FROM FAILOVER PROCESSING WITHIN A SWITCH

BACKGROUND OF THE INVENTION

1. Field of the Invention

Embodiments of the present invention generally relate to high availability data storage systems and, more particularly, to a method and apparatus for immunizing applications on a host server from a switch component failover within a switch that connects a storage volume to a server.

2. Description of the Related Art

Modern computer networks generally comprise a plurality of user computers connected to one another and to a computer server via a communication network. To provide redundancy and high availability of the information in applications that are executed upon the computer server, multiple computer servers maybe arranged in a cluster, i.e., forming a server cluster. Such server clusters are available under the trademark VERITAS CLUSTER SERVER from Veritas Software Corporation at Mountain View, Calif. In a center of a cluster, a plurality of servers communicate with one another to facilitate failover redundancy such that when software or hardware, i.e., computer resources, become inoperative on one server, another server can quickly execute the same software that was running on the inoperative server substantially without interruption. As such, user services that are supported by a server cluster would not be substantially impacted by inoperative server or software.

Within a server cluster, the servers are generally connected to at least one switch that controls routing of data to/from one or more storage volumes. Each switch contains a plurality of switch components that facilitate routing data and read/write requests to and from the storage volume or volumes. The switch component comprises a computer processor that executes storage volume manager software containing a virtualization engine. One example at storage volume manager software is the VERITAS VOLUME MANAGER ($V_xVM$) available from Veritas Software Corporation of Mountain View, Calif. The virtualization engine provides virtual logic units (VLUNs) that are mapped to the various physical logical units of the storage volumes. Such virtualization enables the server to address the storage volume through the use of VLUNs.

The storage volume generally comprises two data ports that are each coupled to a host server via a data switch. Each of the data ports of the storage volume are coupled to a virtualization card within the switch. A virtualization card is a specific embodiment of a switch component that executes the volume manager software and provide virtualization services to the host server. The virtualization cards are coupled to separate data ports on the host server. A processor within the switch designates the two data ports as active, while one virtualization card is deemed active and the other virtualization card is deemed to be in a standby mode. As such, one card actively provides virtualization services and the other card awaits failure of the active card. Upon failure of the active card, the standby card is activated and begins to provide virtualization services. In this manner, the two virtualization cards supporting the two data ports form a failover pair of cards.

During the virtualization card failover process, the host server operates in a normal manner and continues to issue read/write requests. When the active virtualization card fails, the failover process begins and the read/write requests cannot be serviced from any of the ports until the failover process completes. When the read/write command is not answered by the storage volume, the host server will issue a "health command" or other form of status check request that will request information regarding the availability of the VLUN. Since the virtualization cards are in the midst of a failover process, status check requests of the VLUN are not serviced/responded. Such an occurrence may cause the host server to begin a failover process to another server, may cause an application to crash, or may cause the server operating system to crash.

Therefore, there is a need in the art for a method and apparatus to immunize applications executing on the host server from the virtualization card failover process occurring in the switch such that the host server will not be affected by such a failover process.

SUMMARY OF THE INVENTION

The embodiments of the present invention are generally directed to a method and apparatus for providing host server application immunization from a switch component failover process that may occur within a data switch that couples the host server to a storage volume. The method and apparatus caches any non-read/write (R/W) information (e.g., storage volume and switch status information) that is generated by the switch during initialization of the storage volume. The information is cached in switch components (e.g., the virtualization cards) that facilitate communication between the server and the storage volume. Upon failure of a switch component within a failover pair of switch components, the read/write requests issued by the server are ignored by the volume manager software executed within the switch. Non-R/W information requests or other forms of "health check" and "status" commands are responded to using the information from the information cached on the switch components. As such, during failover of an active component to a standby component, the host server will not be able to process read and write requests, yet any non-R/W information or health check information that is requested to confirm that the virtual logical unit is still available will be answered affirmatively using the cached information. As such, the host server continues to retry read and write requests until the failover process within the switch is completed. Consequently, the application and operating systems running on the host server will not fail or otherwise crash causing a disruption in service to a client during the virtualization card failover process.

BRIEF DESCRIPTION OF THE DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings in detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to.

DETAILED DESCRIPTION

Figure 1:
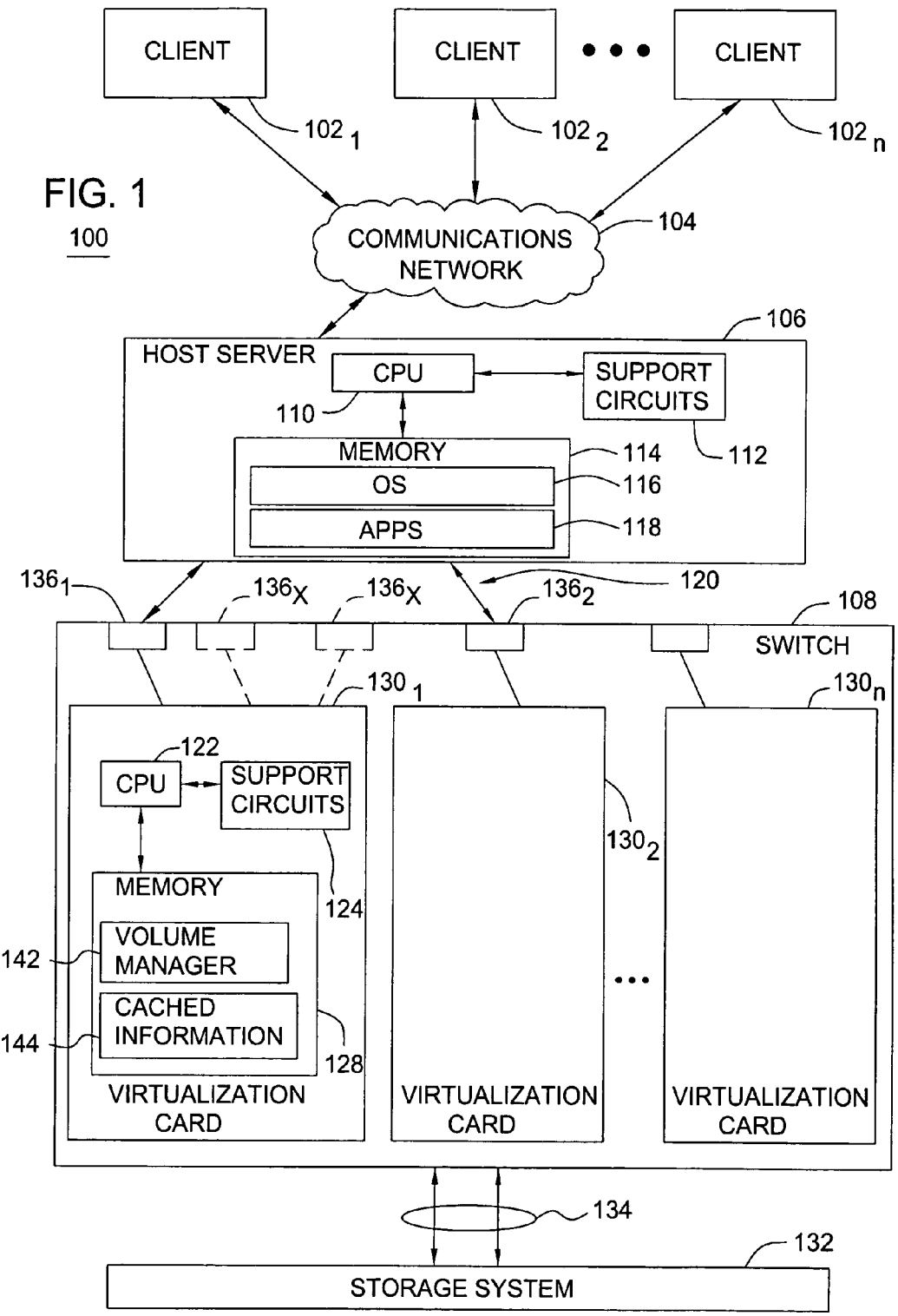
FIG. 1 is a block diagram of a computer network that operates in accordance with the present invention.

FIG. 1 depicts a computer network 100 in which the embodiments of the present invention may be utilized. This figure only portrays one variation of the myriad of possible network configurations. For example, FIG. 1 could have depicted numerous host servers 106 as well as including various switches 108 between the host servers 106 and a plurality of storage volumes 132. For simplicity and clarity, one host server 106, one switch 108 and one storage volume 132 are depicted and described below. The invention, as shall be discussed below, is a method and apparatus for immunizing a host server applications from a switch component (e.g., virtualization card) failover process that may occur within a data switch 108 that connects the host server 106 to a storage volume 132.

The computer network 100 comprises a plurality of client computers, $102_1, 102_2 \ldots 102_n$, that are connected to one another through a conventional data communications network 104. A host server 106 is coupled to the communication network 104 to supply application and data services as well as other resource services to the clients $102_1, 102_2 \ldots 102_n$. The host server 106 is coupled to a storage volume 132 via a network data switch 108.

The host server 106 comprises at least one central processing unit 110, support circuits 112, and memory 114. The CPU 110 may comprise one or more conventionally available microprocessors. The support circuits 112 are well known circuits used to promote functionality of the CPU 110. Such circuits include but are not limited to a cache, power supplies, clock circuits, input/output (I/O) circuits and the like. The memory 114 contained within the host server 106 may comprise random access memory, read only memory, removable disk memory, flash memory, and various combinations of these types of memory. The memory 114 is sometimes referred to main memory and may, in part, be used as cache memory or buffer memory. The memory 114 generally stores the operating system 116 of the host server 116 and various forms of application software 118. The operating system may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like.

The network data switch 108 is designed to couple the input/output (I/O) ports 120 of the host server 106 to the I/O ports 134 of the storage volume 132. The storage volume 132 generally comprises one or more disk drives, or disk drive arrays, that are used as a mass storage device for the host server 106. Such a storage volume 132 when coupled to the switch 108 will support a plurality of host servers (only one of which is depicted). The switch 108 couples the storage volume 132 to the server 106 using various virtualization cards $130_1, 130_2 \ldots 130_n$. The virtualization cards are arranged in pairs, known as failover pairs (active and standby), This pair will support two data pathways between the storage volume 132 and a particular host server 106. The second card will be used to form a standby card to handle virtualization of the storage volume 132 in case the active virtualization card fails. Such an arrangement provides a high availability pathway for information to flow between the storage volume 132 and the host server 106. Each virtualization card 130 may be coupled to one or more switch ports $136_x$.

Virtualization services are provided by a microprocessor 122. The microprocessor may be an application specific integrated circuit (ASIC). The microprocessor 122 is coupled to support circuits 124 and memory 128. The circuitry used as support circuits and memory is conventional and is similar to the arrangement described above for the server 106. The memory is generally random access memory and/or read only memory. To support the operation and functionality of the present invention, the memory 140 may be partially used as cache memory to temporarily store cached information 144. The actual storage location of the cached information 144 is unimportant. The storage location will generally vary with the form of switch implementation. It is only important that the cached information be accessible by both virtualization cards in the failover pair. As such, the embodiment shown herein as storing the cached information is merely illustrative of one location that such information could be stored. The memory 128 also stores volume manager software 142 that, when executed, provides virtualization services to one or more host servers 106. This volume manager software 142 contains a virtualization engine that supports the use of virtual logic unit numbers (VLUNs).

Under normal operation, the host server 106, in support of its operating system 116 and application programs 118, will send read/write requests to the switch 108. These requests are addressed using a VLUN. These requests are then routed by the volume manager software 142 to the storage volume 132. The storage volume 132 appropriately responds to the request for reading and writing of information. The volume manager software establishes VLUNs for each active virtualization card. The VLUNs enable the volume manager software to route the read/write requests to any number of physical LUNs while the host server need only address a single VLUN.

Figure 2:
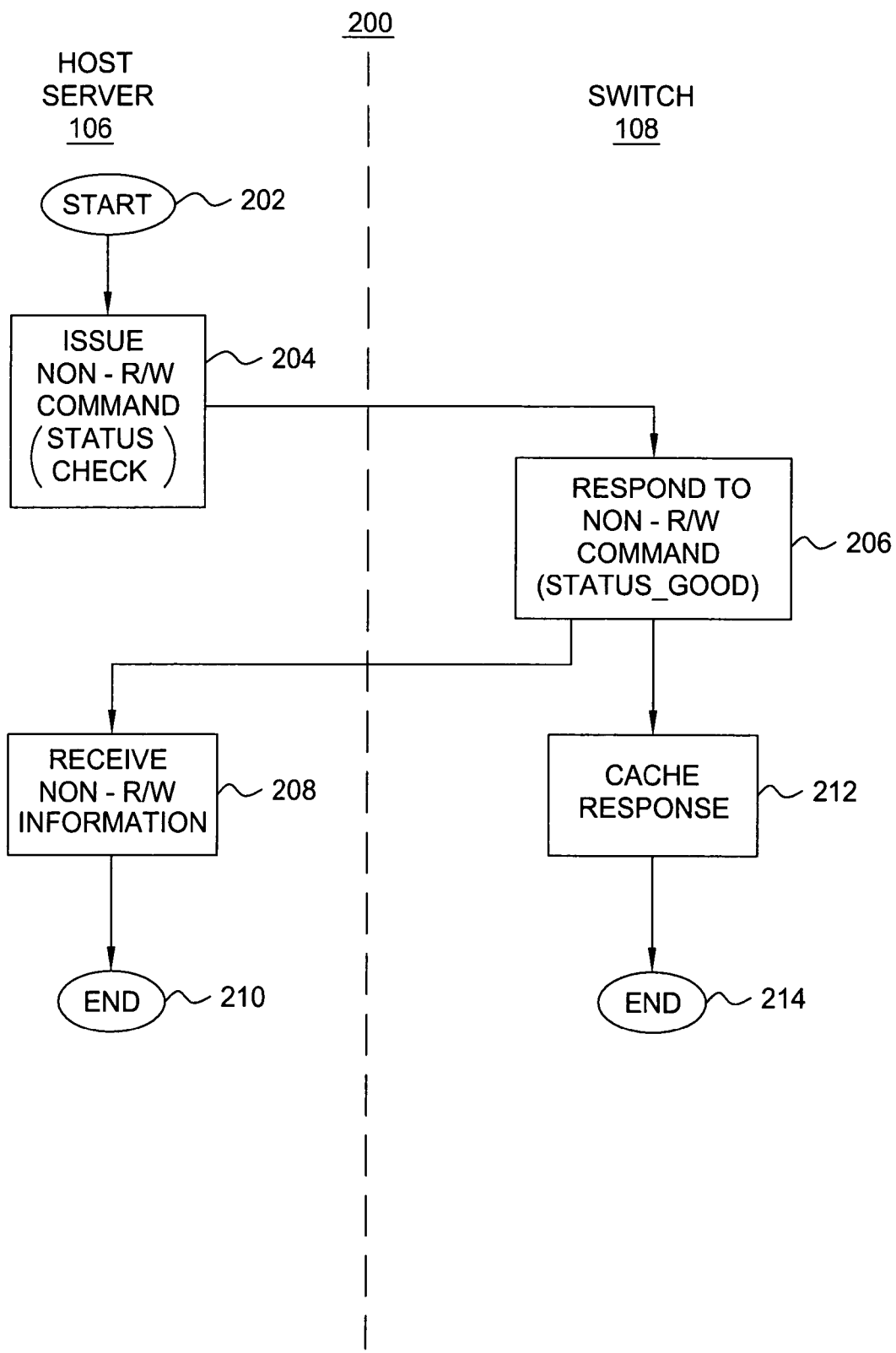
FIG. 2 depicts a flow diagram of a process for initializing the non-R/W command information cache in accordance with the present invention.

FIG. 2 depicts a flow diagram of the initialization process for the present invention. The initialization process 200 is executed when the host server 106 is initializing its access to the storage volume 132 via the switch 108. The process 200 is executed by both the host server 106 and the switch 108 and begins at step 202, then proceeds to step 204 wherein the host server issues non-R/W information (e.g., LUN identification commands or other status related commands) such as at least one of an inquiry command, a test unit ready command, a read capacity command, a mode sense command and the like. The type and variation of the command varies with the type of operating system executing on the host server 106. These non-R/W commands are sent by the server to gather information about the storage volume 132 to facilitate storage volume access, i.e., to determine if the storage volume is operational and what addresses to use to access the volume. The switch 108, upon receiving the command, will respond (at step 206) to the LUN identification command in a conventional operation that provides the information requested to the host server. This information is sometimes referred to in the art as "health check" or status information. Generally, this information is generated within the switch 108 and/or by the volume manager 142. The switch 108 may request the information from the volume manager 142 as needed. Generically speaking, it can be assumed that, at initialization, the status check command would be answered with a STATUS_GOOD response. The host server 106 receives the information at step 208, then ends at step 210. The host server 106 is now initialized and understands that the storage volume 132 is operational and that the volume 132 can be addressed using a particular VLUN. Specifically, the server 106 has the appropriate information to access and use the VLUNs provided by the switch to access data within the storage volume.

After the responses to the non-R/W command at step 206 are completed, the switch 108 proceeds to step 212 where the response that was sent to the host server 106 is cached within the virtualization card $130_1$ that responded to the host server command. The information is also cached in the virtualization card $130_2$ (standby) that is in the failover pair with the active virtualization card $130_1$ that was used to respond to the host's command. The process within the switch ends at step 214 after the response is cached. In this manner, the non-R/W command information is now cached within the active virtualization card as well as the standby virtualization card that is in the failover pair. For purposes of this description, it is assumed that virtualization card $130_1$ is the active virtualization card and the virtualization card $130_2$ is the standby virtualization card.

Figure 3:
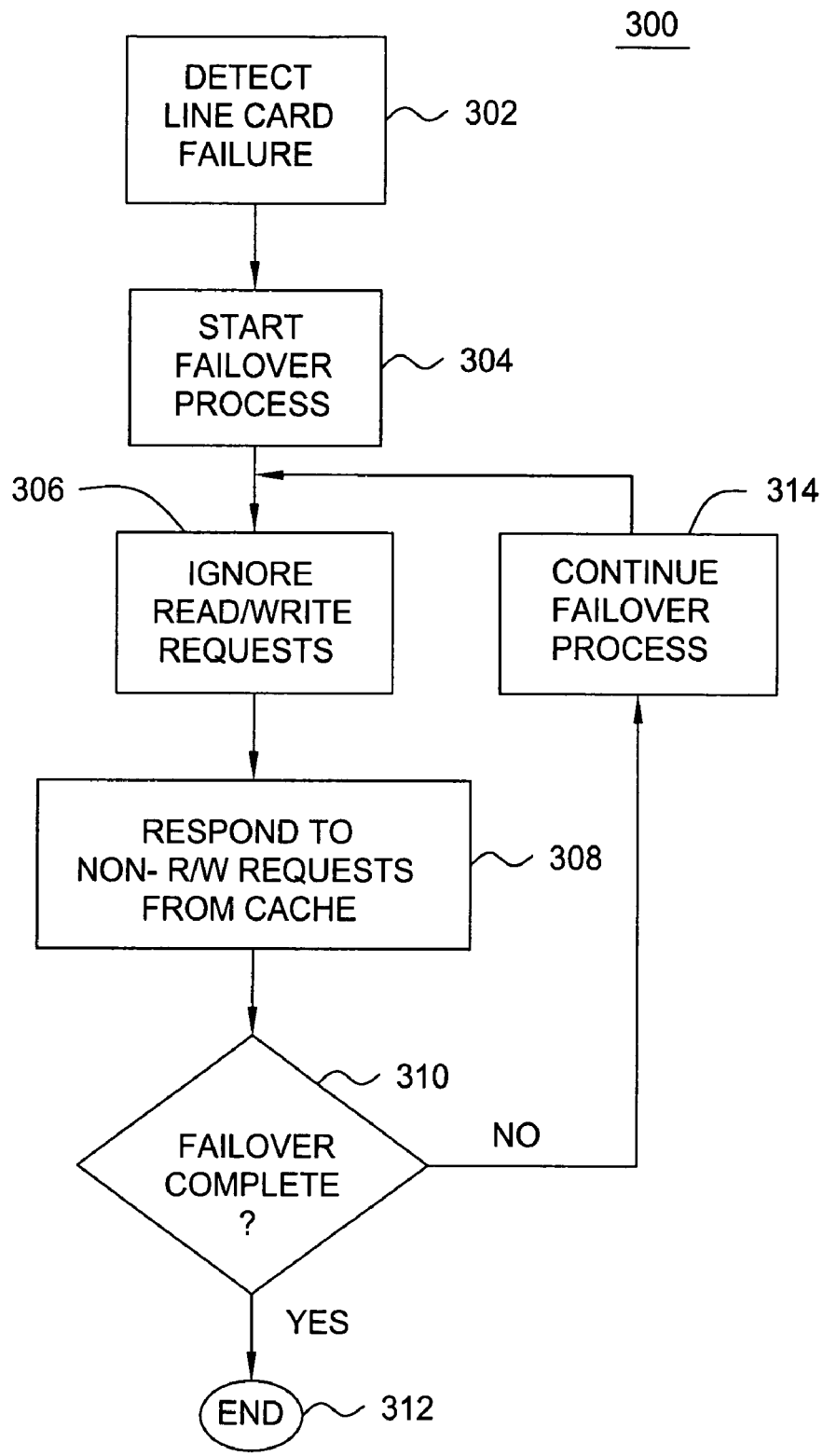
FIG. 3 depicts a flow diagram of a method for immunizing the host server applications from a virtualization card failover process occurring within a switch by using the cached information generated by the method of FIG. 2.

FIG. 3 depicts a flow diagram of a process 300 for handling a virtualization card failure. At step 302, the process 300 detects a virtualization card failure and proceeds to step 304 to begin a failover process for switching from the failed virtualization card to a standby virtualization card. While the failover process occurs, the process 300, at step 306, ignores all read/write requests issued by the host server and, at step 308, responds to all non-R/W information commands from the cache (e.g., from the standby card's cache). The response from the cache is generally a STATUS_GOOD response for all such requests. At step 310, the process 300 queries whether the failover process is complete. If the query is negatively answered, the process 300 proceeds to step 314 to continue the failover process and the return to step 308. If the query is affirmatively answered, the failover process is deemed complete and the process 300 ends at step 312.

Figure 4:
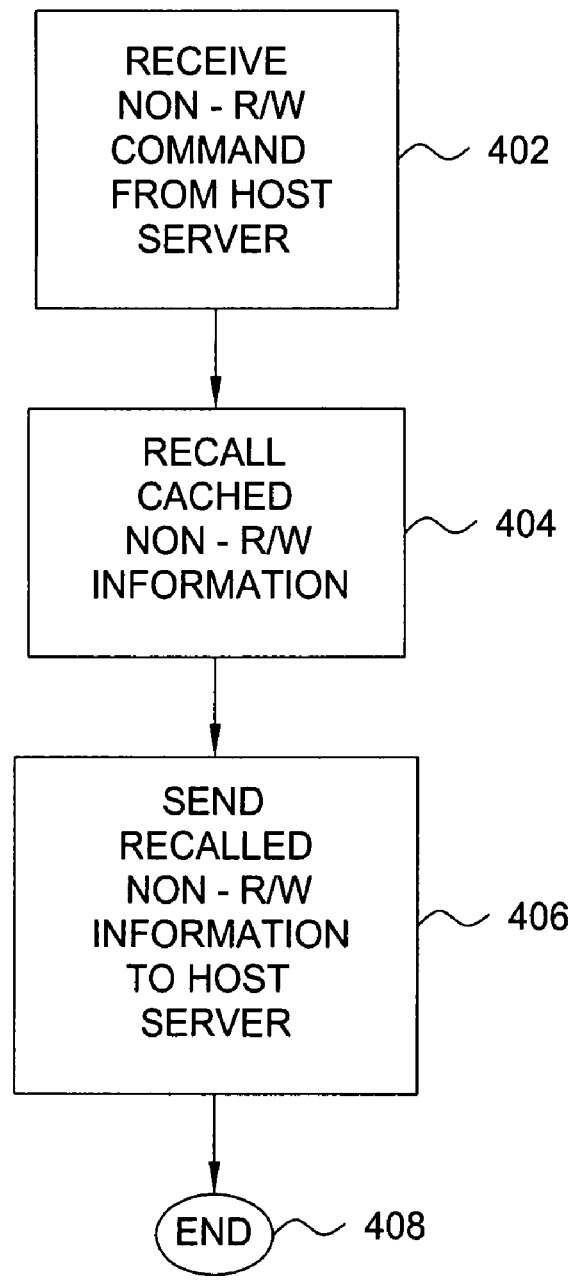
FIG. 4 depicts a flow diagram of the process for recalling the cached information in accordance with the present invention.

FIG. 4 depicts a detailed flow diagram of a process 400 for implementing step 310 of FIG. 3. The process 400 begins when a host server sends a non-R/W information command to the switch while a virtualization card failover process is occurring. At step 404, the process 400 recalls the cached non-R/W information from the cache of the standby virtualization card and, at step 400, the recalled information is sent to the host server in response to the non-R/W information command. The process 400 ends at step 408.

During normal operation of the computer network 100, the host server 106 regularly issues read/write requests to the switch 108. The volume manager software 142 properly routes these requests for implementation. When a virtualization card failover begins, these requests are ignored. As such, the host server 106 will wait for the requested data (read request) or acknowledgement (write request) for a predefined period, e.g., a timeout period. At the end of the timeout period, the host server 106 assumes that something is wrong with the switch 108, storage volume 132 or communication links 120 and 134. As such, the server 106 issues a non-R/W information command that requests information on the availability of the VLUN. The switch 108 responds with the cached information that will ensure that the host server 106 will believe the switch 108 and storage volume 132 are operational. Based upon this belief, the host server 106 issues another read/write request and awaits a response. The host server 106 will continue to loop through the timeout period until the failover is complete and the read/write request is fulfilled. Generally, the time required to complete the failover is much less than the cumulative number of timeout periods that a server will run before an error message is generated. The timeout looping process while the virtualization card failover is occurring within the switch continues for a time that is dependent upon the operating system being used by the host server. In most operating systems, after read/write requests are unanswered for a predefined number of loops or a time period that represents a number of consecutive timeout loops, the operating system informs the applications that an input/output (I/O) error has occurred. As such, virtualization card failover should be completed before this error message is generated.

By ignoring the read/write requests and responding to non-R/W information commands with cached information, the server will not view the failover process as a malfunction in the switch or storage volume that would otherwise cause the server to crash or invoke a server, switch or storage volume failover. As such, the inventive method and apparatus immunizes the server applications from the virtualization card failover process that occurs in a switch located between the server and the storage volume.

While the foregoing is directed to embodiments of the present invention, other and further embodiments of the invention may be devised without departing from the basic scope thereof and the scope thereof is determined by the claims that follow:

What is claimed is:

1. A method for immunizing applications on a host server from a switch component failover comprising:
   beginning a switch component failover process;
   ignoring a read/write request issued by the host server;
   responding to a non-read/write information command using cached information;
   upon initialization of a switch component, caching any non-read/write information delivered to the host server during initialization; and
   when the switch component failover process is complete, responding to read/write requests.

2. The method of claim 1 wherein the cached information is stored within at least one switch component in a plurality of switch components.

3. The method of claim 1 wherein the cached information is cached in memory of at least one pair of switch components.

4. The method of claim 1 wherein the host server waits a predefined period between issuing a read/write request and issuing a non-read/write information command.

5. The method of claim 1 wherein the non-read/write information command comprises a logical unit number identification command.

6. The method of claim 1 wherein the non-read/write information command comprises at least one of an inquiry command, a test unit ready command, a read capacity command, or a mode sense command.

7. The method of claim 1 wherein the switch component is a virtualization card.

8. Apparatus for immunizing applications on a host server from a switch component failover comprising:
   a volume manager for detecting a switch component failure and, upon such a failure, ignoring any read/write request issued by the host server; and
   a cache memory, controlled by the volume manager, for supplying cached non-read/write information whenever the host server issues a non-read/write information command and, upon initialization of a switch component, caching any non-read/write information delivered to the host server during initialization.

9. The apparatus of claim 8 wherein the cached information is stored within at least one switch component in a plurality of switch components.

10. The apparatus of claim 8 wherein the non-read/write information is cached in memory of at least one pair of switch components.

11. The apparatus of claim 8 wherein the host server waits a predefined period between issuing a read/write request and issuing a non-read/write information command.

12. The apparatus of claim 8 wherein the non-read/write information command comprises a logical unit number identification command.

13. The apparatus of claim 8 wherein the non-read/write information command comprises at least one of an inquiry command, a test unit ready command, a read capacity command, or a mode sense command.

14. The apparatus of claim 8 wherein the switch component is a virtualization card.

* * * * *